US012681339B2

(12) United States Patent
Tordjman et al.

(10) Patent No.: US 12,681,339 B2
(45) Date of Patent: Jul. 14, 2026

(54) ELECTRO-OPTIC WAVEGUIDE WITH POLARIZATION CONTROL

(71) Applicant: Quantum Transistors Technology Ltd., Binyamina (IL)

(72) Inventors: Moshe Tordjman, Haifa (IL); Alexander Sherman, Ashdod (IL); Igal Bayn, New York, NY (US)

(73) Assignee: Quantum Transistors Technolgy, Binyamina (IL)

( * ) Notice: Subject to any disclaimer, the term of this patent is extended or adjusted under 35 U.S.C. 154(b) by 275 days.

(21) Appl. No.: 18/542,889

(22) Filed: Dec. 18, 2023

(65) Prior Publication Data

US 2025/0199346 A1 Jun. 19, 2025

(51) Int. Cl.
G02F 1/03 (2006.01)
G02F 1/035 (2006.01)

(52) U.S. Cl.
CPC ............ G02F 1/035 (2013.01); G02F 1/0316 (2013.01)

(58) Field of Classification Search
CPC ............................... G02F 1/035; G02F 1/0316
USPC ............................................................. 385/2
See application file for complete search history.

(56) References Cited

U.S. PATENT DOCUMENTS

| | | | |
|---|---|---|---|
| 10,679,139 B2 | 6/2020 | Hutin et al. | |
| 11,237,454 B2 | 2/2022 | Carolan et al. | |
| 11,281,030 B2 | 3/2022 | Leipold et al. | |
| 11,360,174 B2 | 6/2022 | Lukin et al. | |
| 11,475,347 B1 | 10/2022 | Rudolph et al. | |
| 11,536,897 B1 | 12/2022 | Thompson et al. | |
| 11,768,340 B2 | 9/2023 | Patra et al. | |
| 11,816,537 B2 | 11/2023 | Monroe et al. | |
| 2008/0019648 A1 | 1/2008 | Atwater et al. | |
| 2012/0326116 A1 | 12/2012 | Ellis et al. | |
| 2013/0107352 A1 | 5/2013 | Santori et al. | |
| 2017/0045591 A1 | 2/2017 | Jelezko et al. | |
| 2018/0275341 A1 | 9/2018 | Demaray | |
| 2021/0018767 A1* | 1/2021 | Peng ..................... G01J 3/0229 | |
| 2021/0217809 A1 | 7/2021 | Orcutt et al. | |
| 2021/0224678 A1 | 7/2021 | Wan et al. | |
| 2022/0013977 A1 | 1/2022 | Zhou et al. | |
| 2022/0206361 A1 | 6/2022 | Shen et al. | |

(Continued)

FOREIGN PATENT DOCUMENTS

| | | |
|---|---|---|
| CN | 114676843 A | 6/2022 |
| GB | 2598066 A | 2/2022 |

(Continued)

OTHER PUBLICATIONS

Dusanowski Lukasz et al: "On-Chip Hong-Ou-Mandel Interference from Separate Quantum Dot Emitters in an Integrated Circuit", ACS Photonics, vol. 10, No. 8, Jun. 21, 2023, pp. 2941-2947.

(Continued)

*Primary Examiner* — Jerry M Blevins
(74) *Attorney, Agent, or Firm* — Meitar Patents Ltd.; Daniel Kligler

(57) ABSTRACT

An optoelectronic device includes an optical waveguide disposed on a substrate. The waveguide includes a uniaxial electro-optical crystal having a principal axis parallel to a propagation axis of the waveguide. Electrodes are configured to apply an electric field to the electro-optical crystal so as to rotate a polarization of an optical wave as the optical wave propagates through the waveguide.

14 Claims, 7 Drawing Sheets

FIG. 2D

(56) References Cited

U.S. PATENT DOCUMENTS

| | | | | |
|---|---|---|---|---|
| 2022/0365379 A1* | 11/2022 | Danner | .................. | G02F 1/355 |
| 2023/0393447 A1 | 12/2023 | Thompson et al. | | |
| 2024/0005187 A1 | 1/2024 | Shabani et al. | | |

FOREIGN PATENT DOCUMENTS

| | | | |
|---|---|---|---|
| TW | 202229949 A | 8/2022 |
| WO | 2001075512 A1 | 10/2001 |
| WO | 2021011765 A1 | 1/2021 |
| WO | 2021076221 A1 | 4/2021 |
| WO | 2023038767 A2 | 3/2023 |
| WO | 2024170986 A1 | 8/2024 |
| WO | 2024170987 A1 | 8/2024 |

OTHER PUBLICATIONS

Govdeli Alperen et al: "Room-temperature waveguide-coupled silicon single-photon avalanche diodes", npj Nanophotonics, vol. 1, No. 1, Jan. 25, 2024, pp. 1-10.

European Patent Office (EPO) Communication (Form 1507).

European Search Report (ESR) for European Patent Application No. EP 25 16 4235, dated Jul. 8, 2025.

International Search Report and the Written Opinion of the International Searching Authority for International Application No. PCT/IL2024/051196, dated May 6, 2025.

Lozovik et al., "Non-volatile resonance modes of a photonic cavity in diamond produced by fine-tuning," Journal of Applied Physics, vol. 120, article No. 163107, pp. 1-7, year 2016.

Albrecht et al., "Narrow-band single photon emission at room temperature based on a single Nitrogen-vacancy center coupled to an all-fiber-cavity," arXiv:1407.5825v1, pp. 1-4, Jul. 22, 2014.

Liu et al., "Tailoring of typical color centers in diamond for photonics," Advanced Materials, vol. 33, number 6, article No. 2000891, pp. 1-34, year 2020.

Bhaskar et al., "Quantum nonlinear optics with a germanium-vacancy color center in a nanoscale diamond waveguide," Physical Review Letters, vol. 118, article No. 223603, pp. 1-6, May 31, 2017.

Hauf et al., "Addressing single nitrogen-vacancy centers in diamond with transparent in-plane gate structures," Nano Letters, vol. 14, pp. 2359-2364, year 2014.

Nesladek, "Conventional n-type doping in diamond: state of the art and recent progress," Semiconductor Science and Technology, vol. 20, pp. R19-R27, year 2005.

International Application # PCT/IB2024/051005 Search Report dated May 23, 2024.

International Application # PCT/IB2024/051006 Search Report dated May 27, 2024.

Wan et al., "Large-scale Integration of Artificial Atoms in Hybrid Photonic Circuits," Nature, vol. 583, pp. 226-234, Jul. 8, 2020.

Schrinner et al., "Integration of Diamond-Based Quantum Emitters with Nanophotonic Circuits," Nano Letters, ACS Publications, vol. 20, pp. 8170-8177, year 2020.

Pezzagna et al., "Quantum Computer based on Color Centers in Diamond," Applied Physics Reviews, vol. 8, pp. 1-18, year 2021.

Lee et al., "A Quantum Router Architecture for High-Fidelity Entanglement Flows in Quantum Networks," Nature, vol. 75, pp. 1-8,year 2022.

Walsh, "Statistical Metrology and Process Control of Quantum Devices," Doctoral Thesis, Department of Electronic Engineering and Computer Science, Massachusetts Institute of Technology, pp. 1-187, May 2020.

Choi et al., "Percolation-Based Architecture for Cluster State Creation using Photon-Mediated Entanglement between Atomic Memories," Nature, vol. 104, pp. 1-7, year 2019.

Choi et al., "Supplemental Information—Percolation-Based Architecture for Cluster State Creation using Photon-Mediated Entanglement between Atomic Memories," pp. 1-27, Sep. 20, 2019.

Mouradian et al., "Rectangular Photonic Crystal Nanobeam Cavities in Bulk Diamond," Applied Physics Letters, vol. 111, issue 2, pp. 021103-1-021103-4, year 2017.

Bayn et al., "Fabrication of Triangular Nanobeam Waveguide Networks in Bulk Diamond Using Single-Crystal Silicon Hard Masks," Applied Physics Letters, vol. 105, pp. 211101-1-211101-5, year 2014.

Bayn et al., "Triangular Nanobeam Photonic Cavities in Single-Crystal Diamond," New Journal of Physics, vol. 13, issue 2, pp. 1-14, year 2011.

Faraon et al., "Coupling of Nitrogen-Vacancy Centers to Photonic Crystal Cavities in Monocrystalline Diamond," Physics Review Letters, vol. 109, pp. 1-14, year 2012.

Bayn et al., "Ultra High-Q Photonic Crystal Nanocavity Design: The Effect of a Low-ε Slab Material," Optics Express, vol. 16, No. 7, pp. 1-9, year 2008.

Zhang et al., "High-Fidelity single-shot Readout of single Electron spin in Diamond with spin-to-charge Conversion," Nature Communications, pp. 1-6, year 2021.

Khanaliloo et al., "Single-Crystal Diamond Nanobeam Waveguide Optomechanics," Physical Review X, vol. 5, issue 4, pp. 041051-1-041051-21, year 2015.

Zhang et al., "Material Platforms for Defect Qubits and Single-Photon Emitters," Applied Physics Reviews, vol. 7, pp. 031308-1-031308-30, Sep. 21, 2020.

Chatterjee et al., "Semiconductor Qubits in Practice," Nature Reviews—Physics, vol. 3, pp. 157-177, Mar. 2021.

Ruf et al., "Quantum Networks Based on Color Centers in Diamond," Journal of Applied Physics, vol. 130, pp. 07091-1-070901-20, year 2021.

Wolfowicz et al., "Quantum Guidelines for Solid-State Spin Defects," Nature—Reviews, vol. 6, pp. 906-925, Oct. 2021.

Li et al., "Heterogeneous Integration of Spin-photon Interfaces with a Scalable CMOS Platform," arXiv:2308.14289v2, pp. 1-26, Dec. 20, 2023.

Zgonik et al., "Dielectric, Elastic, Piezoelectric, Electro-optic, and Elasto-optic Tensors of BaTiO3 Crystals," Physical Review B, vol. 50, No. 9, Sep. 1, 1994.

Chen et al., "Surface Transfer Doping of Semiconductors," Progress in Surface Science, vol. 84, pp. 279-321, year 2009.

Karvounis et al., "Barium Titanate Nanostructures and Thin Films for Photonics," Advanced Optical Materials, vol. 8, pp. 1-23, year 2020.

Yanikgonul et al., "2D Monte Carlo Simulation of Silicon Waveguide-based Single-photon Avalanche Diode for Visible Wavelengths," Optics Express, vol. 26, No. 12, pp. 15232-15246, Jun. 2018.

Sutula et al., "Large-scale Optical Characterization of Solid-state Quantum Emitters," arXiv:2210.13643v1, pp. 1-17, Oct. 24, 2022.

Tordjman et al., U.S. Appl. No. 18/542,901, filed Dec. 18, 2023.

Bayn et al., U.S. Appl. No. 18/171,351, filed Feb. 19, 2023.

Tordjman et al., U.S. Appl. No. 18/542,858, filed Dec. 18, 2023.

Tordjman et al., U.S. Appl. No. 18/542,868, filed Dec. 18, 2023.

Non-Final Office Action, U.S. Appl. No. 18/171,351, dated Aug. 19, 2025.

* cited by examiner

ELECTRO-OPTIC WAVEGUIDE WITH POLARIZATION CONTROL

FIELD

The present invention relates generally to integrated photonic devices, and particularly to photonic devices for use in quantum computing.

BACKGROUND

Ferroelectric perovskites are a family of crystalline materials exhibiting $ABO_3$ structure. They have various useful properties, including strong dielectric, ferroelectric, piezoelectric, and electro-optic effects. Members of the family include strontium titanate ($SrTiO_3$), barium titanate (Ba-$TiO_3$, also referred to as BTO), lead titanate ($PbTiO_3$), barium strontium titanate (BST), lead zirconate titanate (PZT), potassium niobate ($KNbO_3$), and lithium niobate ($LiNbO_3$).

The terms "light" and "optical radiation" are used herein synonymously to refer to electromagnetic radiation in any of the visible, ultraviolet, and infrared spectral ranges.

SUMMARY

Embodiments of the present invention that are described hereinbelow provide integrated photonic devices and methods for their use.

There is therefore provided, in accordance with an embodiment of the invention, an optoelectronic device, including a substrate and an optical waveguide disposed on the substrate. The waveguide includes a uniaxial electro-optical crystal having a principal axis parallel to a propagation axis of the waveguide. Electrodes are configured to apply an electric field to the electro-optical crystal so as to rotate a polarization of an optical wave as the optical wave propagates through the waveguide.

In a disclosed embodiment, the electro-optical crystal includes barium titanate (BTO).

In some embodiments, the electrodes include at least first electrodes configured to apply a first electric field along a first axis transverse to the propagation axis and second electrodes configured to apply a second electric field along a second axis transverse to the propagation axis and to the first axis. In a disclosed embodiment, the electrodes further include third electrodes configured to apply a third electric field along the propagation axis so as to zero an electrical bias across the electro-optical crystal along the propagation axis.

Additionally or alternatively, the device includes a controller, which is configured to adjust respective first and second voltages that are applied to the first and second electrodes so as to cause the polarization of the optical wave to rotate by a selected rotation angle over a length of the electro-optical crystal. In one embodiment, the controller is configured to set the first and second voltages so as to zero a polarization-dependent dispersion of the electro-optical crystal, whereby the selected rotation angle is zero.

Further additionally or alternatively, the electrodes are configured to apply the electric field to the electro-optical crystal so as to rotate a first polarization of a first guided mode propagating in the waveguide into alignment with a second polarization of a second guided mode propagating in the waveguide.

There is also provided, in accordance with an embodiment of the invention, a method for optical control, which includes forming an optical waveguide on a substrate, the waveguide including a uniaxial electro-optical crystal having a principal axis parallel to a propagation axis of the waveguide. An electric field is applied to the electro-optical crystal so as to rotate a polarization of an optical wave as the optical wave propagates through the waveguide.

The present invention will be more fully understood from the following detailed description of the embodiments thereof, taken together with the drawings in which:

DETAILED DESCRIPTION

Overview

Figure 1:
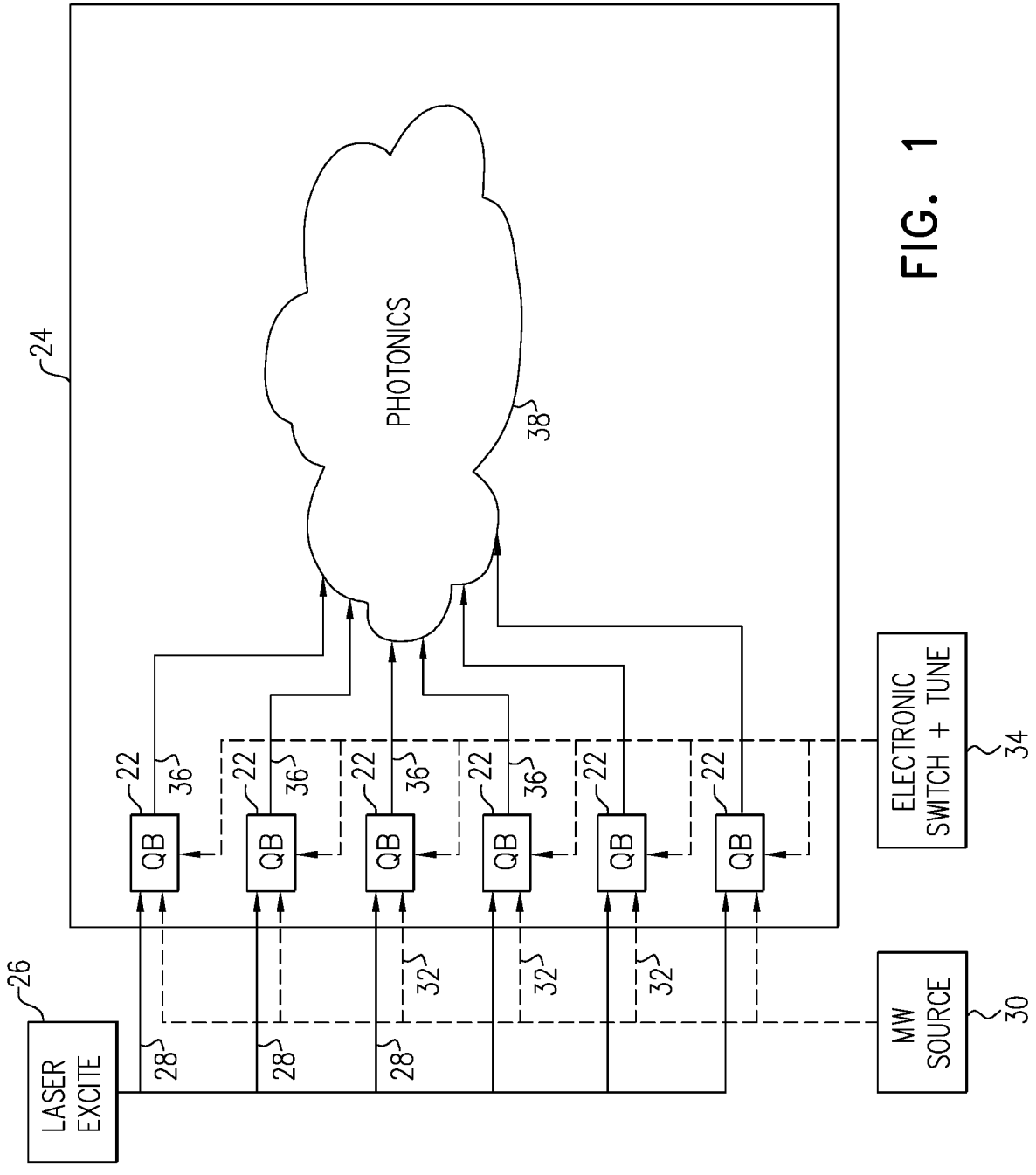
FIG. 1 is a block diagram that schematically illustrates a quantum computing system, in accordance with an embodiment of the invention.

U.S. patent application Ser. No. 18/171,351, filed Feb. 19, 2023, whose disclosure is incorporated herein by reference, describes a novel quantum computing device that is referred to as a "quantum transistor." The quantum transistor comprises a crystal defect, for example a nitrogen vacancy (NV) color center in a diamond crystal. The crystal defect is contained in an optical resonator having a resonant wavelength band that contains the emission wavelength of the crystal defect. The resonator may comprise, for example, periodic structures formed in the crystalline material on opposing sides of the defect to act as distributed Bragg reflectors. It is desirable that the resonator have a high Q factor and low mode volume to increase the quantum efficiency of the device. Electrodes are connected to the crystalline material to switch the charge state of the crystal defect and tune the emission wavelength. This design provides a stable, versatile, solid-state qubit.

There is a need for ancillary materials and components that can be integrated with quantum transistors for purposes of optical coupling and control. The unusual properties of ferroelectric perovskites make them attractive for this purpose. BTO in particular is well suited for working with devices based on diamond crystal defects because the refractive index of BTO ($n_O=2.40$) closely matches that of diamond (2.41). BTO also has high electro-optic and piezo-electric coefficients, meaning that moderate applied voltages will result in large swings in the refractive index or in the strain in the BTO crystal. A BTO coating on diamond is also an effective hole donor (surface acceptor of electrons), which can modify the surface doping of the diamond, and thus its band structure.

On the basis of these properties, embodiments of the present invention that are described herein provide a range of integrated photonic devices based on BTO, and specifically (although not exclusively), based on combinations of BTO with diamond waveguides containing crystal defects. In some of these embodiments, the BTO is applied to a diamond waveguide as a sort of cladding, i.e., a thin membrane of BTO is formed in proximity to the diamond. Application of an electric field across the BTO causes an electro-optic or piezoelectric modulation, which in turn affects the properties of the diamond waveguide, for example to tune the resonant frequency of a cavity in the waveguide that contains a crystal defect. Additionally or alternatively, the electric field can be used to tune the wavelength of the defect using piezoelectrically induced strain.

In other embodiments, the BTO is itself configured as a waveguide or is integrated into the diamond waveguide. In some such embodiments, the BTO is integrated into a resonant cavity in the diamond waveguide, such as a cavity containing a crystal defect, and can then be used to tune the cavity by electro-optical or piezoelectric modulation of the effective cavity length. In other embodiments, a BTO waveguide is coupled to transfer a guided wave into a diamond waveguide or to receive a guided wave from the diamond waveguide. The polarization of the guided wave in the BTO waveguide can be manipulated by application of appropriate voltages to modulate the birefringent properties of the BTO electro-optically.

In still other embodiments, a thin film of BTO is applied as a coating on a diamond crystal, for example over an area of the diamond crystal containing a crystal defect. The BTO acts as a tunable surface carrier donor material (typically a hole donor), which interacts with one or more doped surface layers on the diamond to create a two-dimensional (2D) hole gas in the vicinity of the crystal defect. Application of a voltage across the BTO switches the diamond surface doping, and thus enables tuning of the crystal defect charge.

Although the embodiments described herein below relate specifically to BTO and to integration of BTO with diamond waveguides and crystal defects, the principles of these embodiments may alternatively be applied, mutatis mutandis, using other ferroelectric perovskites, as well as to other sorts of crystals and crystal defects. Furthermore, although the present embodiments are directed particularly to applications in quantum computing, the principles of these embodiments may also be applied in other areas of integrated crystal optics. All such alternative implementations and applications are considered to be within the scope of the present invention.

System Description

FIG. 1 is a block diagram that schematically illustrates a quantum computing system 20, in accordance with an embodiment of the invention. System 20 is shown here to illustrate an example environment in which BTO may be used in controlling, enhancing, and communicating optically with solid-state qubits 22. Systems of this sort are described in greater detail in the above-mentioned U.S. patent application Ser. No. 18/171,351.

In this example, qubits 22 comprise quantum transistors, which are mounted on a PIC 24. Each quantum transistor comprises a diamond chiplet, which includes an NV defect contained in an optical resonator, with electrodes connected to the chiplet, as shown in detail in the figures that follow. In some embodiments, the diamond chiplet comprises a waveguide, and the optical resonator is formed in this diamond waveguide, which couples to PIC 24. Modes of integration of BTO with the diamond waveguide are shown in the figures that follow.

PIC 24 comprises a substrate, such as a silicon-on-insulator (SOI) substrate, on which a network of waveguides with low propagation loss is formed, for example SiN waveguides, for conveying optical radiation to and from qubits 22. Alternatively, other types of substrates may be used, such as a silicon or glass substrate. In the present example, these waveguides include input waveguides 28, which inject one or more optical excitation beams, for example a green beam output by a laser 26 at around 532 nm, into qubits 22 via a suitable coupler. In addition, output waveguides 36 on PIC 24 receive the radiation emitted from the qubits, for example red radiation in the zero-phonon line (ZPL) of the NV-defects, at approximately 637 nm via another coupler. Methods for optically coupling waveguides 28 and 36 to the diamond chiplet containing the NV defect are described further hereinbelow. Some of these embodiments use BTO waveguides for purposes of coupling, as well as polarization rotation.

In addition, a microwave source 30 generates a microwave input 32 to qubits 22, to drive transitions between the electron spin energy levels of the NV-ground state. These transitions can be exploited both in reading the state of a qubit and in shifting the NV defects between ground and superposition states, which can be used both in single-qubit operations and in creating entanglement between qubits.

Electronic control circuitry 34 applies electrical signals to the electrodes of qubits 22 (as shown in the figures that follow) in order to switch the defect charge states and tune the emission wavelengths of the crystal defects. Additionally or alternatively, circuitry 34 may perform other switching and control functions, such as driving electro-optical elements to transfer beams among waveguides, as well as modifying the polarization of guided waves. These functions are described further hereinbelow. Circuitry 34 typically comprises digital logic circuits, which may be hard-wired or programmable, together with suitable analog and digital interfaces to enable the circuitry to interact with the other components of system 20 and with the other optoelectronic devices that are described herein. Alternatively or additionally, at least some of the functions of circuitry 34 may be carried out by a programmable processor under the control of software instructions.

In the pictured embodiment, output waveguides 36 couple qubits 22 to a photonic network 38, which in turn connects the output signals from the qubits to optical detectors (not shown). The details of network 38 are beyond the scope of the present disclosure.

Diamond Cavity with BTO Cladding

Figures 2A, 2B:
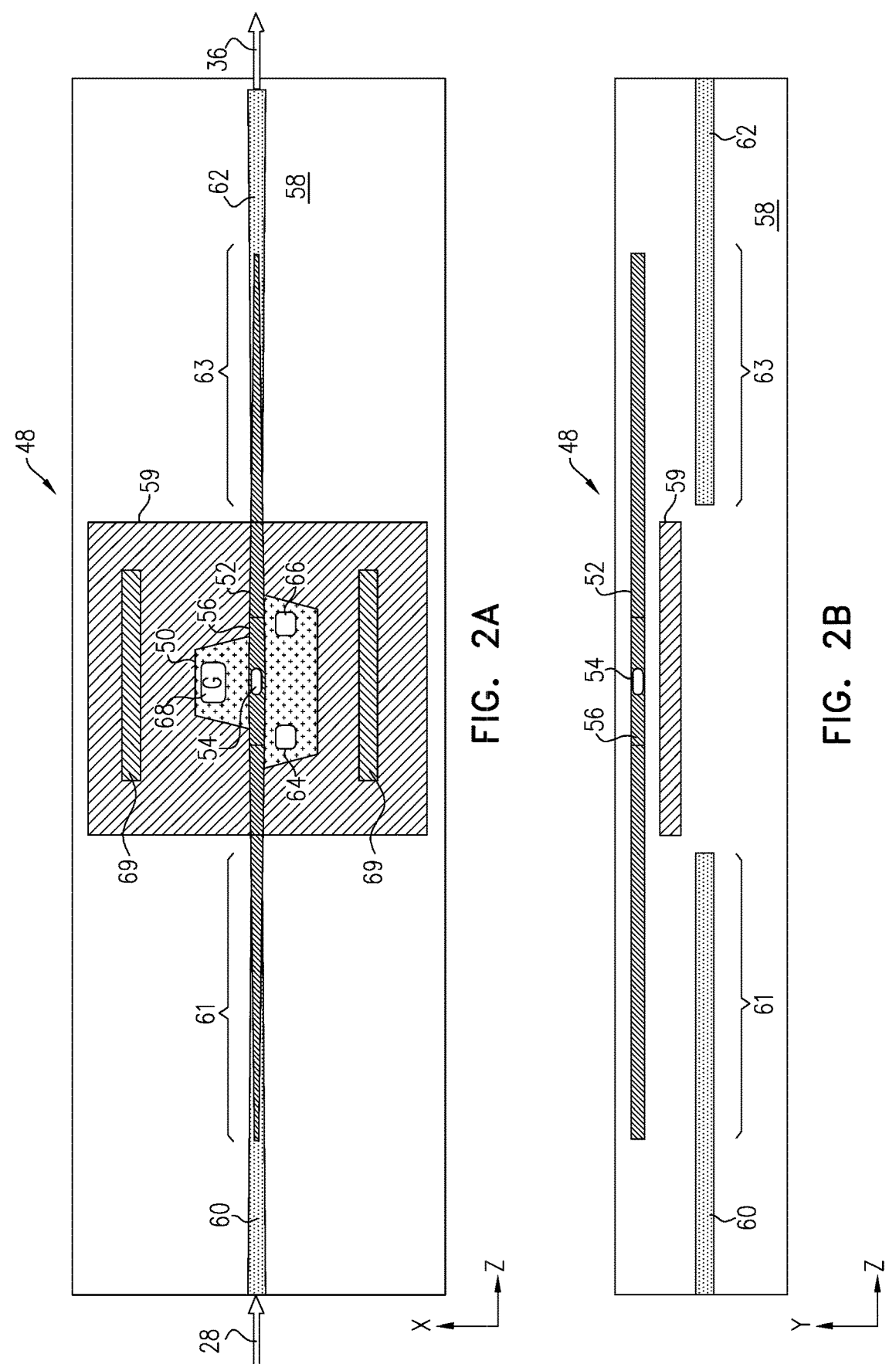
FIGS. 2A, 2B, and 2C are schematic top, side, and sectional views, respectively, of a quantum transistor, in accordance with an embodiment of the invention.
Figures 2C, 2D:
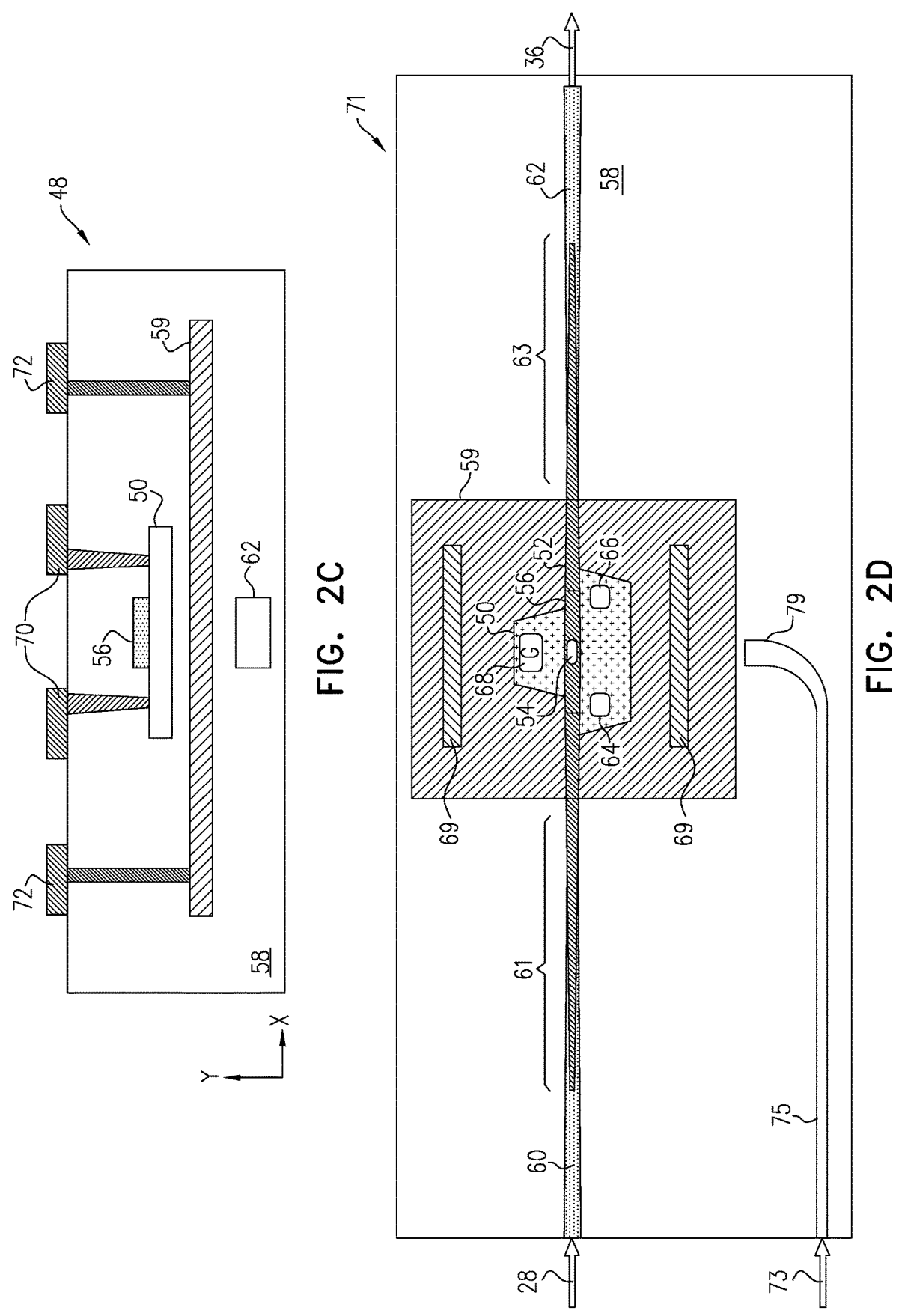
FIG. 2D is a schematic top view of a quantum transistor, in accordance with an alternative embodiment of the present invention.

FIGS. 2A, 2B, and 2C are schematic top, side, and sectional views, respectively, of a quantum transistor 48, in accordance with an embodiment of the invention. Quantum transistor 48 is similar to the quantum transistors described in the above-mentioned U.S. patent application Ser. No. 18/171,351, with the addition of a BTO membrane 59, for purposes of controlling the operation of the quantum transistor, as described further hereinbelow. In the present figures, the Z-axis is taken to be the direction of propagation of light into and out of quantum transistor 48, the X-axis is the transverse direction in the plane of PIC 24, and the Y-axis is perpendicular to this plane. Although the present embodiment is described, for the same of concreteness and clarity, with reference to the specific topology and functionality of a quantum transistor, BTO may similarly be used in tuning and controlling the operation of other sorts of qubits based on crystal defects in diamond. Furthermore, as noted above, the principles of the present embodiments may be applied to qubits based on other types of crystal defects, as well as using other sorts of ferroelectric perovskites.

In quantum transistor 48, an NV defect 54 is formed in a diamond waveguide 52, such as a ridge waveguide in the pictured embodiment. NV defect 54 can be formed, for example, by electron irradiation, ion nano-implantation, or pulsed laser irradiation of the diamond crystal. Waveguide 52 in this example comprises narrow, rectangular ridge disposed on a broader slab 50 of diamond. The waveguide and slab can be produced, for example, by photolithographic etching of a diamond membrane.

In a typical implementation, waveguide 52 has a length in the range of 10-50 μm, and a height and width in the range of 100-300 nm. The thickness of slab 50 beneath waveguide 52 is typically in the range of 50-150 nm. The dimensions of waveguide 52 may advantageously be chosen to support single-mode operation at both the excitation wavelength and the emission wavelength of defect 54. BTO membrane 59 typically has a thickness between 50 and 80 nm and length and width in the range of 5-20 μm. Membrane 59 is separated from slab 50 by a gap of about 150 nm, containing a dielectric material such as $SiO_2$. Alternatively, other dimensions and other types of diamond waveguides and BTO membranes may be used.

Figure 3:
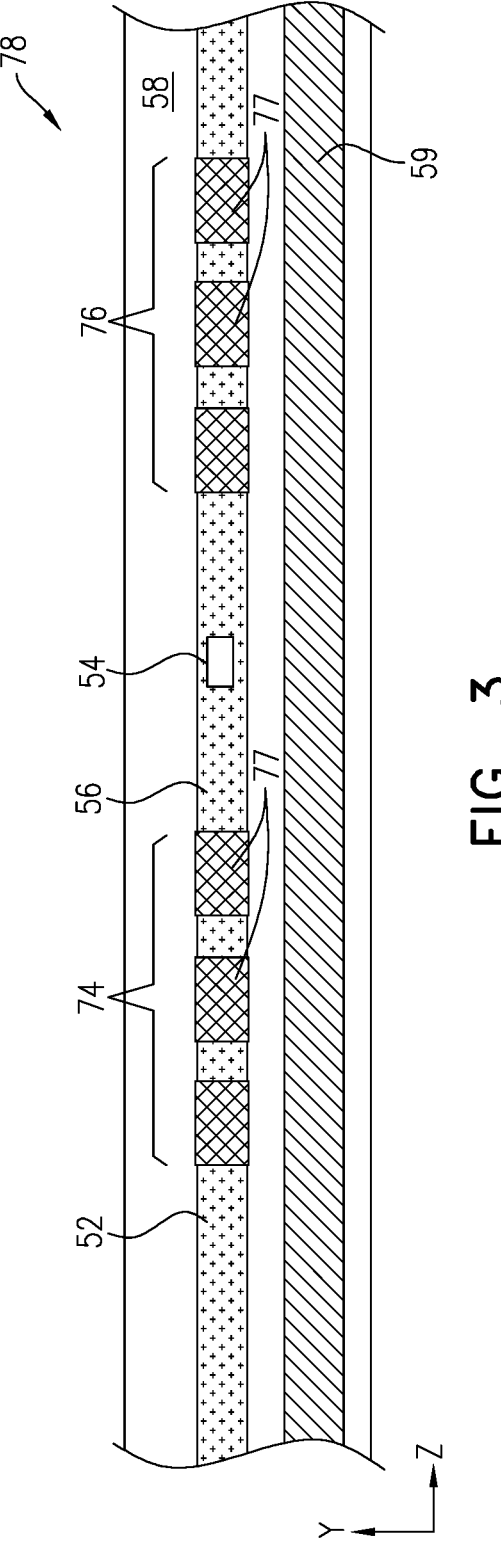
FIG. 3 is a schematic side view of a waveguide in a qubit showing details of an optical resonator implemented in the waveguide, in accordance with an embodiment of the invention.
Figures 4A, 4B:
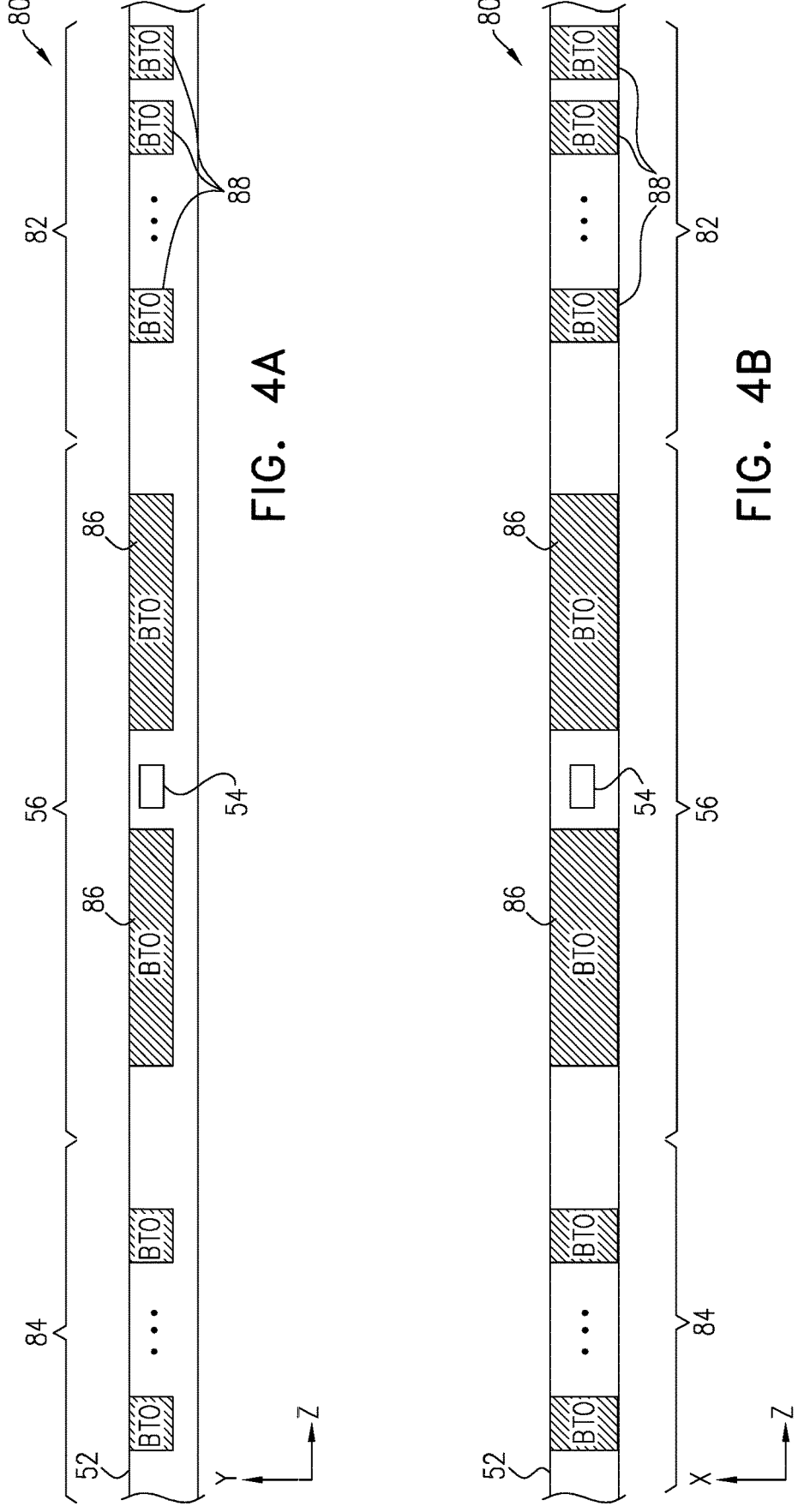
FIGS. 4A and 4B are schematic side and top views, respectively, of a waveguide in a qubit showing details of an optical resonator implemented in the waveguide, in accordance with another embodiment of the invention.

An optical resonator 56, containing defect 54, is formed in the central part of waveguide 52. Resonator 56 has a high-Q resonant wavelength band that contains the ZPL emission wavelength of defect 54. The wavelength band of the resonator may be tunable, for example using the electro-optical or piezoelectric properties of BTO membrane 59. (In an alternative embodiment, the BTO may be embedded within the resonator itself, for example as shown in FIGS. 4A/B.) Resonator 56 is defined in the present embodiment by periodic structures formed in waveguide 52, for example as shown in FIG. 3. This type of resonator is advantageous in achieving high Q and a small mode volume. Alternatively, other types of resonant structures may be used.

Input waveguide 28 and output waveguide 36 terminate in respective adiabatic tapers 60 and 62 on a PIC substrate 58 within quantum transistor 48. Tapers 60 and 62 are produced, for example, by suitable etching of a SiN layer on PIC 24. Tapers 60 and 62 are overlaid by corresponding inverse tapers of the ends of diamond waveguide 52 in respective overlap regions 61 and 63. As noted above, waveguide 52 and BTO membrane 59 may be separated in the Z-direction from one another and from the underlying tapers 60 and 62 by a thin dielectric layer, for example comprising $SiO_2$. The light input through waveguide 28 is transferred adiabatically, with low loss, by evanescent wave coupling from taper 60 into the overlying part of diamond waveguide 52 in region 61; and the light output from defect 54 is similarly transferred from diamond waveguide 52 into taper 62 in region 63. For efficient adiabatic coupling, the lengths of overlap regions 61 and 63 in the X-direction are typically in the range of 10-20 μm.

Conductive electrodes are deposited on diamond slab 50, including a source electrode 64, a drain electrode 66, and a gate electrode 68, in proximity to defect 54. Source electrode 64 and drain electrode 66 are deposited on opposing sides of defect 54, defining a longitudinal axis through their respective locations. (In the present example, this longitudinal axis runs parallel to the Z-axis, but other orientations of the longitudinal axis may alternatively be used.) When a voltage is applied through an active conductive channel between source electrode 64 and drain electrode 66, it will give rise to an electric field within diamond waveguide 52 along the Z-axis. Gate electrode 68 is offset from the longitudinal axis, so that a voltage applied between the gate electrode and drain electrode 66 (or between the gate electrode and source electrode 64), for example, will give rise to a transverse electric field component along the X-direction within diamond waveguide 52. In addition, conductive electrodes 69 are deposited on BTO membrane 59 on opposite sides of resonator 56 and are used to generate an electric field within the BTO, giving rise to electro-optic and/or piezoelectric effects.

Control circuitry 34 (FIG. 1) drives electrodes 64, 66 and 68 via contacts 70 to control the charge state of NV defect 54 and to tune the ZPL wavelength emitted by the crystal defect. TO enable this functionality, a semiconductor hole donor layer (electron acceptor) is formed over the surface of diamond waveguide 52, between the electrodes (particularly gate electrode 68) and NV defect 54. This donor layer may comprise, for example, a transition metal oxide (TMO) and/or transition metal dichalcogenide (TMD), or the donor layer may be formed by suitable doping of the diamond itself. A number of possible donor layer configurations of these sorts are described in the above-mentioned U.S. patent application Ser. No. 18/171,351. Alternatively, the donor layer may comprise a ferroelectric perovskite, such as BTO, which can have a tunable work function and can act as a tunable donor layer on diamond, as described further hereinbelow with reference to FIG. 7.

To control the properties of BTO membrane 59, control circuitry 34 drives electrodes 69 via contacts 72. Application of an electric field between electrodes 69 gives rise to electro-optical modulation of the refractive index of membrane 59, which in turn modifies the effective refractive index, and hence the effective length and resonant wavelength of optical resonator 56. Additionally or alternatively, the piezoelectric effect in BTO membrane can be used to modulate the ZPL of defect 54 by phonon strain modification or by changing the actual physical length of optical resonator 56.

The voltage to be applied between electrodes 69 depends on the desired change in the refractive index of BTO membrane 59. The change in the refractive index of BTO membrane 59 is given by $\Delta n = 0.5 \times n_o^3 \times r_{42} \times E$, wherein $n_o$ is the refractive index of the BTO membrane ($n_O = 2.4025$ for a bulk crystal of BTO), $r_{42} = 923$ pm/V is the electro-optic tensor element, and E is the electric field. Assuming electrodes 69 to be spaced apart by 5.54 μm, application of a bias voltage $V_b = 20$ volts between the electrodes will give rise to an electric field $E = 3.61$ V/μm. In this case, $\Delta n = 0.0232$. The change in refractive index gives rise to a phase delay in resonator 56, leading to a change in the resonant frequency, which can be tuned by adjusting the bias voltage.

FIG. 2D is a schematic top view of a quantum transistor 71, in accordance with an alternative embodiment of the invention. In this embodiment, the light from an additional input waveguide 73 is conveyed via a curved waveguide 75, terminating in an inverse taper 79, to defect 54 by free propagation from the edge of taper 79 into waveguide 52 toward defect 54. In such a case, the edge of taper 79 may be positioned a few microns apart from the side of resonator 56 so as to limit dispersion caused by free propagation. The gap separation between the light input and the defect increases the resonator quality factor Q.

The alternative geometry shown in FIG. 2D may be used for qubit excitation at both green and red wavelengths. For example, the red excitation may be conveyed via input waveguide 28, while the green excitation is conveyed via input waveguide 73. Alternatively, both excitation wavelengths may be conveyed toward defect 54 by free propagation through the same side or opposite sides of waveguide 52. Although waveguide 75 is directed toward waveguide 52 at a 90° angle, the angle between the waveguides may alternatively be less than 90°. Furthermore, although FIG. 2D shows a particular quantum transistor configuration, which includes BTO membrane 59, the principles of this embodiment, including free propagation of excitation radiation, may likewise be implemented in other devices comprising crystal defects in resonant cavities, such as those described in U.S. patent application Ser. No. 18/171,351.

FIG. 3 is a schematic side view of a qubit 78, including optical resonator 56 and NV defect 54 within waveguide 52, in accordance with an embodiment of the invention. Elements that appear in this and subsequent figures and are similar in structure and function to the elements of FIGS. 2A-C are labeled with the same indicator numbers.

Resonator 56 is defined by a pair of distributed Bragg reflectors 74, 76, which comprise diamond interleaved with segments 77 of a different refractive index, for example segments of SiO₂. Application of a DC voltage to BTO membrane 59 causes the BTO to expand or contract along the Z-direction, thus stretching or squeezing distributed Bragg reflectors 74 and 76 and increasing or decreasing the Bragg wavelengths. In this manner, the resonant wavelength of resonator 56 can be tuned. Additionally or alternatively, the piezoelectric effect in membrane 59 can be used to microscopically change the length of the membrane, leading to a crystal matrix deformation and thus tuning the resonant wavelength of resonator 56.

Alternatively or additionally, as noted above, the ZPL of crystal defect 54 may be tuned by phonon strain modification, or the effective length of cavity 56 can be modulated by the electro-optic effect in membrane 59. As in the previous example, the required tuning can typically be achieved by application of a DC voltage in the range of 1-50 volts between the appropriate electrodes, depending on the electrode geometry and the desired tuning range.

Diamond Waveguide with Integrated BTO

FIGS. 4A and 4B are schematic side and top views, respectively, of waveguide 52 in a qubit 80 showing details of optical resonator 56 implemented in the waveguide, in accordance with another embodiment of the invention. As in the preceding embodiment, resonator 56 is defined by distributed Bragg reflectors 82 and 84 on either side of the resonator.

In the embodiment of FIGS. 4A/B, however, cavity 56 and reflectors 82 and 84 contain BTO segments 86 and 88, respectively, which are integrated into the diamond crystal of waveguide 52. For example, cavities may be etched in the diamond crystal, and BTO may then be deposited in the cavities to form the structures shown in FIGS. 4A/B.

Because the refractive index of BTO is close to that of diamond, the BTO will have little effect on the optical guiding properties of waveguide 52. The electro-optical and piezoelectric properties of the BTO, however, can be used to control various aspects of the functionality of cavity 56. For example:

The piezoelectric effect in BTO segments 86 can be used to adjust the length of cavity 56 and thus tune the cavity resonance to the ZPL of crystal defect 54.

The electro-optic effect in BTO segments 86 can be used to rotate the polarization of light propagating in waveguide 52. (This technique of polarization rotation is described in greater details with reference to FIGS. 6A/B.)

Polarization rotation by the electro-optic effect in BTO segments 86 can also be used to selectively couple light into and out of waveguide 52 using the controllable birefringence of the BTO, well as splitting and switching light between alternative paths (not shown) following the output of qubit 80, based on the output polarization from the qubit. Polarization rotation can also be used together with a polarizing optical component for purposes of beam amplitude modulation.

Phase modulation by the Pockels effect in BTO segments 86 can be used for purposes of phase matching inside cavity 56, as well as phase matching of output radiation downstream from qubit 80.

The piezoelectric effect and/or the electro-optic effect in BTO segments 88 in reflectors 82 and 84 can be used to tune the Bragg wavelength and reflectivity of the reflectors, thus adjusting the resonant wavelength and Q-factor of cavity 56.

Beam Control Using BTO Waveguides

Figure 5A:
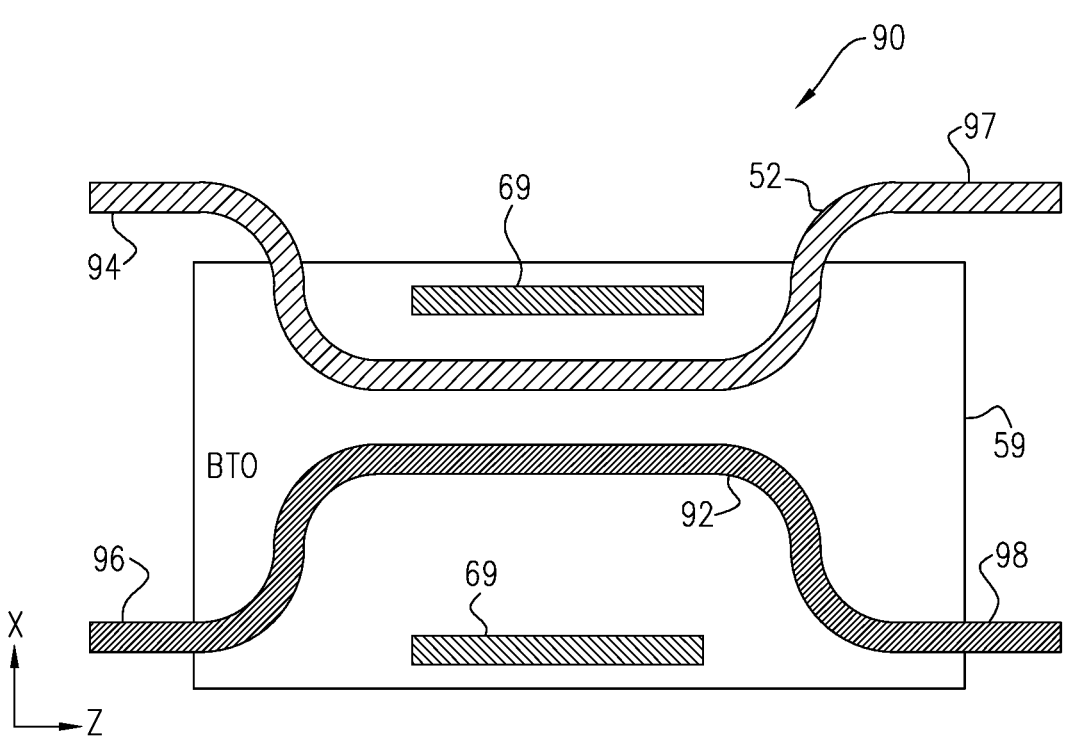
FIGS. 5A and 5B are schematic top and side views, respectively, of a controllable optical coupler, in accordance with an embodiment of the invention.
Figure 5B:
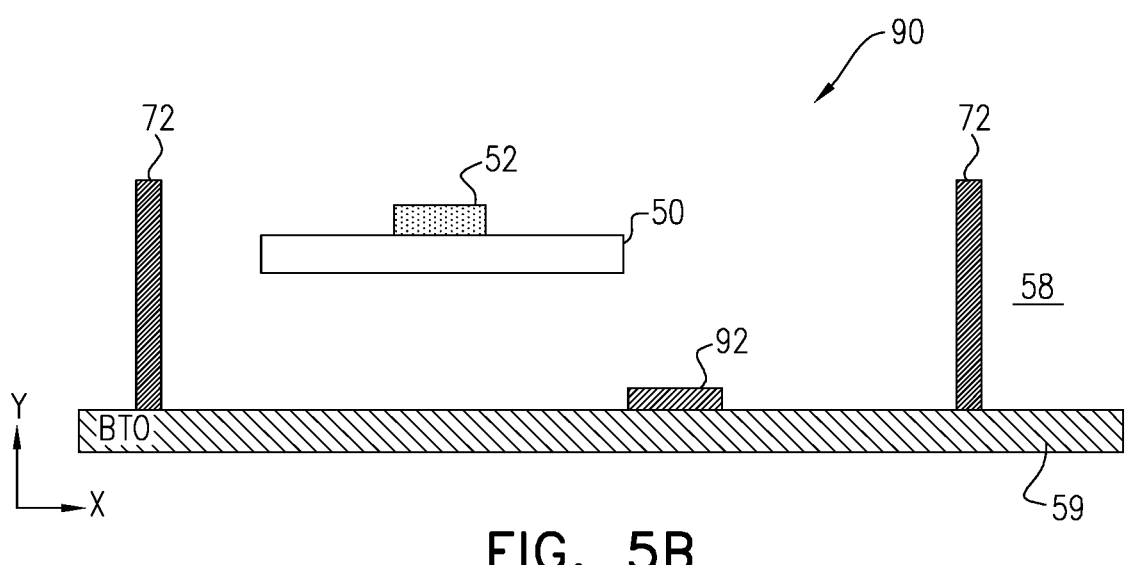
Figure 6A:
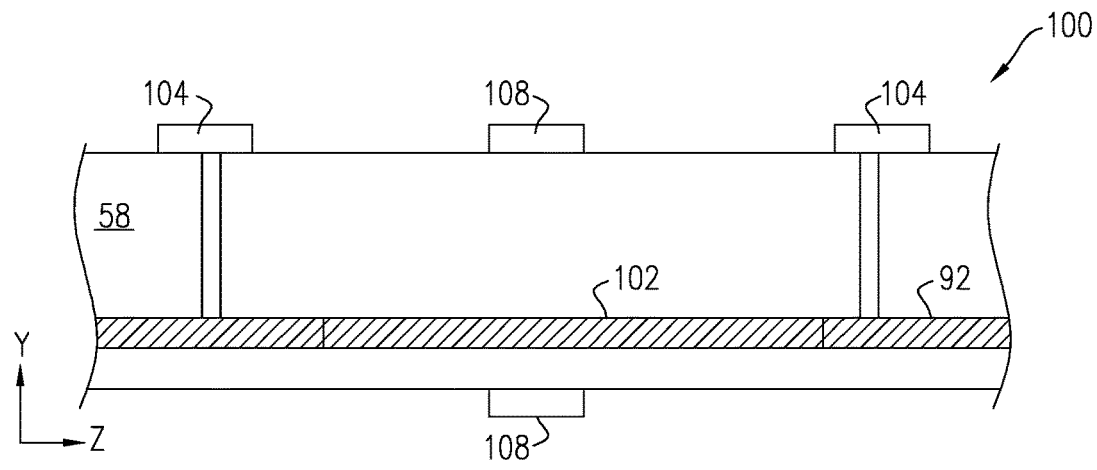
FIGS. 6A and 6B are schematic side and top views, respectively, of a controllable polarization rotator, in accordance with an embodiment of the invention.

FIGS. 5A and 5B are schematic top and side views, respectively, of a controllable optical coupler 90, for coupling light between diamond waveguide 52 and a BTO waveguide 92, in accordance with an embodiment of the invention. Coupler 90 can be used to switch light selectively, for example, from a diamond-based qubit to BTO waveguide 92. BTO waveguide 92 can be used for polarization control, for example as shown in FIGS. 6A/B. Alternatively or additionally, BTO waveguide 92 can be used as an intermediary stage in switching light from diamond waveguide 52 to an output waveguide, such as a SiN waveguide, as illustrated in FIGS. 2A-C.

Diamond waveguide 52 and BTO waveguide 92 are formed as ridges on underlying layers of diamond and BTO, such as diamond slab 50 and BTO membrane 59. Light enters coupler 90 through an entrance port 94 defined in diamond waveguide 52 and exits through exit port 97 in the diamond waveguide or exit ports 96 and 98 in BTO waveguide 92. Application of the appropriate voltage between electrodes 69 on BTO membrane 59 modulates the phase of the wave propagating in BTO waveguide 92 so as to control the coupling efficiency between diamond waveguide 52 and BTO waveguide 92 and thus switches the qubit emission between ports 97 and 98 depending on the bias applied to BTO membrane 59 by electrodes 69.

In alternative embodiments, other sorts of coupling geometries and coupling mechanisms may be implemented between diamond waveguide 52 and BTO waveguide 92. For example, for wavelength-selective coupling, a ring resonator (not shown in the figures) may be formed on BTO membrane 59 between diamond waveguide 52 and BTO waveguide 92.

Figure 6B:
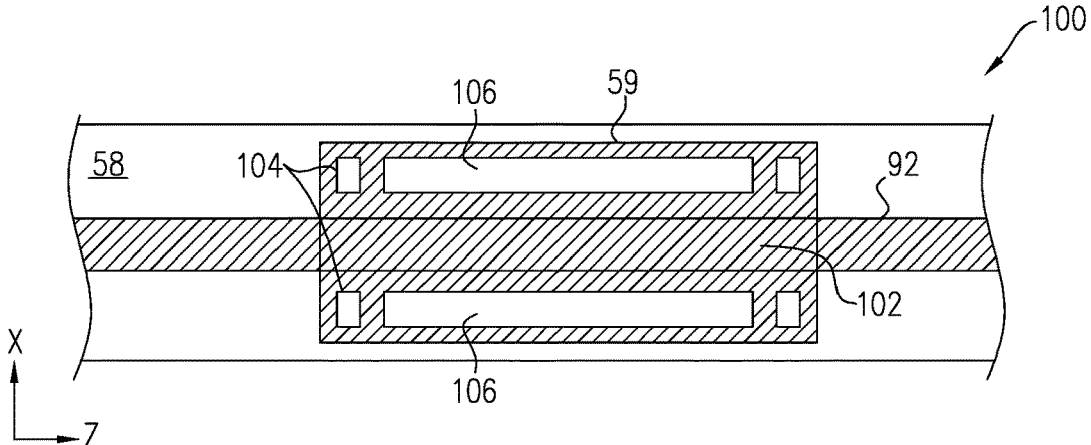

FIGS. 6A and 6B are schematic side and top views, respectively, of a controllable polarization rotator 100 based on the electro-optic effect in a segment 102 of BTO waveguide 92, in accordance with an embodiment of the invention. This embodiment takes advantage of the fact that BTO is a uniaxial electro-optical crystal and is characterized by strong coefficients in the optical indicatrix of the electro-optic effect, particularly in the mixed polarization term $r_{42}$, which is 1300 pm/V for a thin film of BTO. Alternatively, the principles of the present embodiment may be applied to other uniaxial electro-optical crystals, including (but not limited to) other ferroelectric perovskites.

A guided beam of light propagates through polarization rotator 100 along the Z-axis, which is parallel to the principal axis of the BTO in segment 102. Pairs of electrodes 104, 106, and 108 apply electric fields to the BTO in segment 102 along the Z-, X-, and Y-axes, respectively. (For clarity of illustration, FIGS. 6A and 6B show respective planes containing waveguide 92, and therefore electrodes 106 are omitted from FIG. 6A, while electrodes 108 are omitted from FIG. 6B.) The fields due to electrodes 106 and 108, transverse to the propagation axis, drive the rotation of polarization of the guided beam due to the mixed polarization term $r_{42}$. As in the preceding example, the length of segment 102 is typically in the range of a few microns. A voltage in the range of 10-50 volts between the electrodes gives rise to the desired change in refractive index, and thus the desired degree of polarization rotation. The field due to electrodes 104 may be controlled to ensure that the electrical bias along the propagation axis is zero, and thus avoid undesired background effects. In an alternative embodiment, the electrical biases between the pairs of electrodes 106 and 108 may be held at zero, while a voltage is applied between electrodes 104 to modify the phase delay of the guided beam passing through segment 102.

A controller, such as control circuitry 34 (FIG. 1), adjusts the voltages that are applied between electrodes 106 and between electrodes 108 so as to rotate the polarization of optical waves propagating in waveguide 92 by a selected rotation angle over the length of segment 102. The rotation occurs as a result of the controllable birefringence of the BTO, i.e., the difference between the ordinary and extraordinary refractive indexes, $n_O$ and $n_e$, of the BTO, together with the rotation of the principal axis of the BTO about the waveguide propagation axis (Z) due to the applied voltage. The birefringence is induced and controlled by the mixed polarization term $r_{42}$, due to the electric field applied along the X-axis and/or the Y-axis. This birefringence gives rise to a polarization-dependent dispersion in segment 102, wherein the dispersion per unit length is proportional to the applied voltage.

In some embodiments, the controller applies voltages to electrodes 104, 106 and/or 108 to control the polarization of the guided wave that is output from rotator 100. In other words, the controller applies an electric field to BTO segment 102 so as to rotate the polarization of the guided mode propagating in waveguide 92 into alignment with a desired polarization.

As another example, rotator 100 may be controller to rotate an input wave of arbitrary polarization into a desired output polarization. This latter functionality can be useful, for example, in coupling qubits 22 efficiently to photonic network 38 (FIG. 1), by matching the output polarization of the qubits to the polarization (for example, TE-polarization) of single-mode waveguides and other components in network 38.

In an alternative embodiment, the voltages applied to electrodes 104, 106 and/or 108 are selected so as to zero a polarization-dependent dispersion of BTO segment 102, such that $n_O = n_e$ within the segment. In this case, BT segment 102 behaves as an isotropic crystal, with output polarization identical to the input polarization. The controller may thus switch polarization rotator 100 between an isotropic, polarization-preserving state and an anisotropic, polarization-rotating state, with rotation proportional to the applied voltage.

BTO Donor Layer Over a Quantum Transistor

Figure 7:
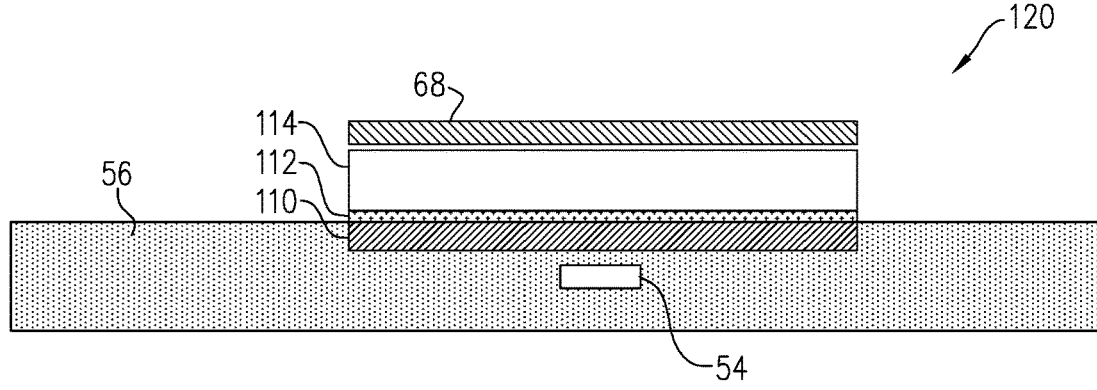
FIG. 7 is a schematic sectional view of semiconductor layers on a diamond crystal in a quantum transistor, in accordance with an embodiment of the invention.

FIG. 7 is a schematic sectional view of semiconductor layers on a diamond crystal in a quantum transistor 120, in accordance with an embodiment of the invention. FIG. 7 shows only a part of quantum transistor 120, i.e., the part that is in close proximity to NV defect 54 within resonator 56. The other elements of quantum transistor 120 are similar to those of quantum transistor 48, as a shown in FIGS. 2A-C or to the quantum transistors described in the above-mentioned U.S. patent application Ser. No. 18/171,351.

Quantum transistor 120 comprises one or more doped layers, which are formed over NV defect 54 in the crystalline material of diamond resonator 56 in proximity to the NV defect, along with a surface carrier donor material formed on the surface of the diamond over the one or more doped layers. Specifically in the present example, a P-type doped layer 110 is formed over NV defect 54, with an H-terminated surface layer 112 formed over layer 110. A BTO layer 114 is deposited over surface layer 112 and serves as the carrier donor material, i.e., as a hole donor and electron acceptor. Gate electrode 68 is deposited over BTO layer 114 and is connected to control circuitry, such as control circuitry 34 (FIG. 1), which applies appropriate voltages to gate electrode 68 to switch the charge state of NV defect 54 between its ground and excited states.

When a suitable voltage is applied to gate electrode 68, it gives rise to a band-bending energy and eventually releases carriers from BTO layer 114 in the vicinity of defect 54, thus creating a two-dimensional hole gas over the defect. Depending on the electrode configuration, defect 54 can then be switched between the $NV^0$ and $NV^-$ charge states by switching the polarity of the voltage applied between source electrode 64 and drain electrode 66. In other words, applying a sufficient voltage of the proper polarity will switch defect 54 to the $NV^-$ charge state by shifting the positive and negative carrier bands at the surface of the diamond crystal. Applying a voltage of the opposite polarity will switch defect 54 from the $NV^-$ to the $NV^0$ charge state.

The polarities and magnitudes of the voltages to be applied to electrodes 64, 66 and 68 for the purposes of charge state switching depend on the geometrical and electrical characteristics of quantum transistor 22. BTO layer 114 is advantageous in modifying the band structure of the layers at the diamond surface and creating a dense hole gas, with properties that can be tuned by changing the voltage applied to the BTO.

Alternatively, other surface carrier donor materials can be used in place of BTO, for example as described in the above-mentioned U.S. patent application Ser. No. 18/171, 351.

The embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optoelectronic device, comprising:

a substrate;

an optical waveguide disposed on the substrate, the waveguide comprising a uniaxial electro-optical crystal having a principal axis parallel to a propagation axis of the waveguide;

electrodes configured to apply an electric field to the electro-optical crystal so as to rotate a polarization of an optical wave as the optical wave propagates through the waveguide, wherein the electrodes comprise at least first electrodes configured to apply a first electric field along a first axis transverse to the propagation axis and second electrodes configured to apply a second electric field along a second axis transverse to the propagation axis and to the first axis; and a controller, which is configured to adjust respective first and second voltages that are applied to the first and second electrodes so as to cause the polarization of the optical wave to rotate by a selected rotation angle over a length of the electro-optical crystal.

2. The device according to claim 1, wherein the electro-optical crystal comprises barium titanate (BTO).

3. The device according to claim 1, wherein the controller is configured to set the first and second voltages so as to zero a polarization-dependent dispersion of the electro-optical crystal, whereby the selected rotation angle is zero.

4. An optoelectronic device, comprising:

a substrate;

an optical waveguide disposed on the substrate, the waveguide comprising a uniaxial electro-optical crystal having a principal axis parallel to a propagation axis of the waveguide; and electrodes configured to apply an electric field to the electro-optical crystal so as to rotate a polarization of an optical wave as the optical wave propagates through the waveguide, wherein the electrodes comprise at least first electrodes configured to apply a first electric field along a first axis transverse to the propagation axis and second electrodes configured to apply a second electric field along a second axis transverse to the propagation axis and to the first axis, and wherein the electrodes further comprise third electrodes configured to apply a third electric field along the propagation axis so as to zero an electrical bias across the electro-optical crystal along the propagation axis.

5. The device according to claim 4, and comprising a controller, which is configured to adjust respective first and second voltages that are applied to the first and second electrodes so as to cause the polarization of the optical wave to rotate by a selected rotation angle over a length of the electro-optical crystal.

6. An optoelectronic device, comprising:

a substrate;

an optical waveguide disposed on the substrate, the waveguide comprising a uniaxial electro-optical crystal having a principal axis parallel to a propagation axis of the waveguide; and electrodes configured to apply an electric field to the electro-optical crystal so as to rotate a polarization of an optical wave as the optical wave propagates through the waveguide, wherein the electrodes are configured to apply the electric field to the electro-optical crystal so as to rotate a first polarization of a first guided mode propagating in the waveguide into alignment with a second polarization of a second guided mode propagating in the waveguide.

7. The device according to claim 6, wherein the electrodes comprise at least first electrodes configured to apply a first electric field along a first axis transverse to the propagation axis and second electrodes configured to apply a second electric field along a second axis transverse to the propagation axis and to the first axis.

8. A method for optical control, comprising:

forming an optical waveguide on a substrate, the waveguide comprising a uniaxial electro-optical crystal having a principal axis parallel to a propagation axis of the waveguide; and applying an electric field to the electro-optical crystal so as to rotate a polarization of an optical wave as the optical wave propagates through the waveguide, wherein applying the electric field comprises applying a first electric field along a first axis transverse to the propagation axis and applying a second electric field along a second axis transverse to the propagation axis and to the first axis and adjusting voltages that are applied to the electro-optical crystal so as to cause the polarization of the optical wave to rotate by a selected rotation angle over a length of the electro-optical crystal.

9. The method according to claim 8, wherein the electro-optical crystal comprises barium titanate (BTO).

10. The method according to claim 8, wherein applying the electric field comprises applying a third electric field along the propagation axis so as to zero an electrical bias across the electro-optical crystal along the propagation axis.

11. The method according to claim 8, wherein adjusting the voltages comprises setting the voltages so as to zero a polarization-dependent dispersion of the electro-optical crystal, whereby the selected rotation angle is zero.

12. A method for optical control, comprising:

forming an optical waveguide on a substrate, the waveguide comprising a uniaxial electro-optical crystal having a principal axis parallel to a propagation axis of the waveguide; and applying an electric field to the electro-optical crystal so as to rotate a polarization of an optical wave as the optical wave propagates through the waveguide, wherein applying the electric field comprises rotating a first polarization of a first guided mode propagating in the waveguide into alignment with a second polarization of a second guided mode propagating in the waveguide.

13. The method according to claim 12, wherein applying the electric field comprises applying a first electric field along a first axis transverse to the propagation axis and applying a second electric field along a second axis transverse to the propagation axis and to the first axis.

14. The method according to claim 13, wherein applying the first and second electric fields comprises adjusting voltages that are applied to the electro-optical crystal so as to cause the polarization of the optical wave to rotate by a selected rotation angle over a length of the electro-optical crystal.

* * * * *